(12) United States Patent
Tkachenko et al.

(10) Patent No.: US 10,907,310 B2
(45) Date of Patent: Feb. 2, 2021

(54) AUTOMATIC CONTROL OF DISCHARGE CONVEYOR OF MATERIAL TRANSFER VEHICLE DURING A PAVING OPERATION

(71) Applicant: Roadtec, Inc., Chattanooga, TN (US)

(72) Inventors: Oleg Tkachenko, Hixson, TN (US); John E. Hoffmann, Signal Mountain, TN (US); David Swearingen, Ooltewah, TN (US); Irina Brown, Dalton, GA (US)

(73) Assignee: Roadtec, Inc., Chattanooga, TN (US)

( * ) Notice: Subject to any disclaimer, the term of this patent is extended or adjusted under 35 U.S.C. 154(b) by 283 days.

(21) Appl. No.: 16/106,376

(22) Filed: Aug. 21, 2018

(65) Prior Publication Data

US 2019/0003133 A1 Jan. 3, 2019

Related U.S. Application Data

(63) Continuation-in-part of application No. 15/791,942, filed on Oct. 24, 2017.
(Continued)

(51) Int. Cl.
*E01C 19/00* (2006.01)
*E01C 19/20* (2006.01)
(Continued)

(52) U.S. Cl.
CPC ............ *E01C 19/004* (2013.01); *E01C 19/20* (2013.01); *B65G 41/002* (2013.01); *B65G 41/008* (2013.01); *B65G 67/08* (2013.01); *B65G 67/22* (2013.01); *E01C 2019/2075* (2013.01); *E01C 2301/02* (2013.01); *E01C 2301/04* (2013.01)

(58) Field of Classification Search
CPC .... E01C 19/004; E01C 19/20; E01C 2301/04; E01C 2019/2075; E01C 2301/02; B65G 41/002; B65G 67/08; B65G 41/008; B65G 67/22
See application file for complete search history.

(56) References Cited

U.S. PATENT DOCUMENTS 5,921,708 A 7/1999 Grundl et al.
8,337,118 B2 * 12/2012 Buschmann ............ E01C 19/48
404/84.5
(Continued)

*Primary Examiner* — Michael V Kerrigan
(74) *Attorney, Agent, or Firm* — Chambliss, Bahner & Stophel, P.C.

(57) ABSTRACT

A material transfer vehicle has a discharge conveyor with a discharge chute mounted thereon. A controller is operatively connected to the elevation control system and the steering control system for the discharge conveyor. The controller is adapted to communicate with the elevation control system for the discharge conveyor to adjust the elevation of the discharge conveyor. The controller is also adapted to communicate with the steering control system for the discharge conveyor so that the angular orientation of the discharge conveyor with respect to the longitudinal axis of the material transfer vehicle may be adjusted. A paver-locating sensor is operatively connected to the controller, and is located and adapted to execute multiple non-contact sensor scan passes across the front end of the paving machine to determine the distance and orientation of the paving machine with respect to the paver-locating sensor and to communicate this information.

16 Claims, 9 Drawing Sheets

Related U.S. Application Data

(60) Provisional application No. 62/423,933, filed on Nov. 18, 2016, provisional application No. 62/551,587, filed on Aug. 29, 2017.

(51) Int. Cl.
 *B65G 67/08* (2006.01)
 *B65G 41/00* (2006.01)
 *B65G 67/22* (2006.01)

(56) References Cited

U.S. PATENT DOCUMENTS

| | | |
|---|---|---|
| 10,001,783 B2 | 6/2018 | Zahr |
| 2016/0170415 A1* | 6/2016 | Zahr .................... E01C 19/004 701/23 |

* cited by examiner

AUTOMATIC CONTROL OF DISCHARGE CONVEYOR OF MATERIAL TRANSFER VEHICLE DURING A PAVING OPERATION

CROSS-REFERENCE TO RELATED APPLICATION

This application is a continuation-in-part of U.S. patent application Ser. No. 15/791,942 which was filed on Oct. 24, 2017 and claims the benefit of U.S. Provisional Patent Application No. 62/423,933 that was filed on Nov. 18, 2016. This application also claims the benefit of U.S. Provisional Patent Application No. 62/551,587 which was filed on Aug. 29, 2017.

FIELD OF THE INVENTION

This invention relates generally to a system or combination of components for controlling the location of the discharge conveyor of a material transfer vehicle that is being used to supply asphalt paving material to an asphalt paving machine. More particularly, the invention relates to a system for automatically controlling the positioning of the discharge conveyor of a material transfer vehicle with respect to the hopper of an asphalt paving machine that is being supplied by the material transfer vehicle, in order to keep the upper output end of the discharge conveyor aligned with the hopper as the paving operation is carried out.

BACKGROUND OF THE INVENTION

The traditional process for paving roadways with asphalt paving material is generally carried out by an asphalt paving machine and a number of supply trucks which transport the asphalt paving material from an asphalt production plant to the paving machine. The paving machine generally is self-propelled and driven by a wheeled or tracked drive system. A hopper is located at the front end of the machine to receive asphalt paving material from a dump-type supply truck, and a floating screed is located at the rear end of the machine to form the asphalt mat. A conveyor delivers the asphalt paving material from the hopper to a transversely oriented distributing auger just ahead of the screed that discharges the asphalt paving material across the roadway in front of the screed.

Sometimes, asphalt paving material is discharged directly from a delivery truck into the hopper of the asphalt paving machine. A typical asphalt paving machine has a hopper with a capacity of 5-15 tons, whereas a typical dump-type delivery truck has a capacity of about 20 tons. The front of the paving machine is usually provided with rollers which are adapted to engage the rear tires of a delivery truck. This arrangement enables asphalt paving material to be transferred from the truck to the asphalt paving machine by positioning the delivery truck in front of the paving machine and raising the dump bed of the truck to allow the asphalt paving material to slide down the bed into the hopper of the paving machine as the paving machine pushes the truck along in front of it. However, because the delivery truck usually carries more asphalt paving material than the hopper can receive at one time, it may be necessary for the paving machine to push the delivery truck along for several minutes while its conveyor transports the asphalt paving material out of the hopper to the distributing auger in front of the screed. This may be difficult to manage when the paving machine is proceeding through intersections or operating on curved sections of the roadway.

Furthermore, when the truck bed of the delivery truck is raised, it should not come into contact with the hopper of the paving machine, and it should not be carried by or ride on any portion of the paving machine. For smaller-capacity dump trucks, contact with the hopper of the asphalt paving machine is not often a problem. However, such contact can be a problem when large tractor-semitrailer units are used as delivery vehicles, particularly when the truck bed is extended to its highest point. In addition, if a delivery truck contacts the asphalt paving machine so that a portion of the weight of the delivery truck is carried by the paving machine as the paving operation is carried out, the screed elevation may be changed, which will affect the elevation of the finished asphalt mat.

When asphalt paving material is delivered to the paving machine by delivery trucks, it is frequently necessary for a series of delivery trucks to move into contact with the front end of the paving machine to serially discharge their loads into the paving machine's hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). Furthermore, the ability of the paving machine operator to place a smooth mat on the roadway will be affected by the rate of feed of asphalt paving material to the paving machine. This requires planning for proper scheduling of delivery trucks and coordination with the asphalt production facility. However delays at the production facility or traffic encountered by the delivery trucks can thwart the efforts of the most careful planners. Consequently, because it is desirable to keep the paving machine moving at all times during an asphalt paving operation, and since delivery trucks must be unloaded as they are pushed along in the paving direction, it is frequently necessary to have delivery trucks queue up near the paving machine to ensure that a loaded truck is available to move quickly into unloading position as an unloaded truck is moved out of the way. This may result in heat losses in the asphalt paving material in the waiting trucks, which can affect the quality of the asphalt mat being created by the paving machine.

For all of the difficulties associated with the timely delivery of asphalt paving material by individual delivery trucks to a paving machine, material transfer vehicles have been used in recent years to transport asphalt paving material to asphalt paving machines engaged in paving operations. One type of material transfer vehicle may be used to shuttle asphalt paving material between the delivery trucks and an asphalt paving machine. Such a self-propelled material transfer vehicle typically includes a large-capacity truck-receiving hopper or a windrow pick-up head and an inclined truck-unloading conveyor extending upwardly from the hopper or pick-up head. Asphalt paving material carried by the truck-unloading conveyor from the truck-receiving hopper or windrow pick-up head is discharged off the elevated output end of the truck-unloading conveyor into a chute mounted on the lower end of a discharge conveyor, or into an intermediate surge hopper that is sized to hold the entire load of a delivery truck. The discharge of asphalt paving material off the elevated output end of the truck-unloading conveyor so that it may fall under the influence of gravity into a chute or surge hopper assists in preventing undesirable segregation of the various particulate components of the asphalt paving material by particle size.

Material transfer vehicles of the type that are equipped with a surge hopper typically include a conveyor in the surge hopper that is adapted to transfer the asphalt paving material to the discharge conveyor. Discharge conveyors mounted on material transfer vehicles with and without surge hoppers are generally pivotable about an essentially vertical axis so that the material transfer vehicle can be positioned alongside or in front of an asphalt paving machine that is laying an asphalt mat and rapidly discharge asphalt paving material into the hopper of the paving machine as the material transfer vehicle moves with the paving machine along the roadway. Because of its rapid loading and unloading capabilities, a self-propelled material transfer vehicle can rapidly shuttle between delivery trucks at a pick-up point and an asphalt paving machine that is laying an asphalt mat at a paving site so that there is less likelihood that the paving machine will have to stop paving because of a lack of asphalt paving material.

As is known to those having ordinary skill in the art to which the invention relates, it is critically important to the asphalt paving process to control the speed of the paving machine and the rate of distribution of asphalt paving material across the roadway in front of the screed. When the paving machine does not maintain a constant speed or a constant rate of distribution of asphalt paving material, it is difficult to control the thickness of the asphalt mat. Changing either the speed of the paving machine or the rate of distribution of the asphalt paving material without adjusting the other distribution factor will cause the screed to ride higher or lower on the asphalt mat, thereby creating inconsistent mat thickness in the finished roadway.

Because a self-propelled material transfer vehicle can discharge its load of asphalt paving material into the hopper of the paving machine without coming into contact with the paving machine, proper operation of the material transfer vehicle will rarely require the operator of the paving machine to change the speed of the paving machine during discharge of asphalt material into the paver hopper. However, it is frequently necessary for a material transfer vehicle to travel along with an asphalt paving machine for some distance as it discharges asphalt paving material into the hopper of the paving machine. Sometimes, it is necessary for the material transfer vehicle to anticipate the progress of the asphalt paving machine on curved roadways or through intersections. In such circumstances, it is difficult for an operator of the material transfer vehicle to keep pace with the paving machine and keep the discharge conveyor properly aligned with the hopper of the paving machine. Therefore, considerable skill is required on the part of the operators of the paving machine and the material transfer vehicle to insure that paving proceeds smoothly and efficiently. Consequently, it would be desirable if a more automated system could be developed to would make cooperation between an asphalt paving machine and a material transfer vehicle easier to accomplish.

U.S. Patent No. 5,921,708 describes a control system for a paving convoy that includes at least one paving machine and a material transfer vehicle. This system allows the entire convoy to be controlled from the operator's cabin of one of the vehicles. Each of the controlled vehicles in the convoy includes an operational controller that is connected by a wired or wireless remote-control signal transmission path to a remote controller in the controlling vehicle. The remote controller transmits to each vehicle in the convoy all of the operating parameters that are necessary for maintaining a predetermined distance between the vehicles. A distance sensor on a least one vehicle cooperates with a reference element (i.e., a sensor target) on an adjacent vehicle. The distance sensor is operatively connected to a speed correction device in each vehicle in the convoy, in order to control the speed of each vehicle to maintain a constant distance from the adjacent vehicle in the convoy, based upon the measured distance between the distance sensor and the reference element (i.e., target) on an adjacent vehicle.

U.S. Pat. No. 8,337,118 describes a system for controlling the distance between a material transfer vehicle and an asphalt paving machine. A first position sensor mounted on the upper output end of the discharge conveyor of the material transfer vehicle is directed towards two reference targets which are located on opposite sides of the rear end of the paving machine hopper. These reference targets are spaced apart far enough that they can be independently sensed by the first position sensor on the material transfer vehicle. The first position sensor determines the position of the discharge end of the paver-loading conveyor in, and transversely to, the direction of travel of the material transfer vehicle. A second position sensor is also mounted at or near the upper output end of the discharge conveyor of the material transfer vehicle and adapted to measure the distance between this second sensor and the mound of material in the hopper of the paving machine. The sensors are preferably laser or ultrasonic sensors and the reference targets are preferably reflectors. The positions determined by the sensors are compared in a processing unit of a control device with predetermined desired positions, which processing unit generates appropriate steering and/or drive speed commands for automatically controlling the position of the output end of the discharge conveyor of the material transfer vehicle with respect to the paving machine.

U.S. Pat. No. 10,001,783 describes a system for controlling the operation of a paving machine that is being supplied by a material transfer vehicle. In this system, a distance sensor is mounted on the paving machine. In one embodiment of this system, the distance sensor is mounted on the front end of the paving machine and adapted to measure the distance to a wheel of the material transfer vehicle. In another embodiment, the distance sensor is mounted on a support mast on the top side of the paving machine and is adapted to measure the distance to the output end of the discharge conveyor of the material transfer vehicle. In still another embodiment of this system, both a first position sensor on a support mast on the paving machine and a second position sensor on a support mast on the material transfer vehicle communicate with a satellite navigation system (such as GPS). In each embodiment, the distance or position sensors are operatively connected to a processor, and the processor is connected to a controller for the paving machine. As the material transfer vehicle is driven by an operator, the controller on the paving machine causes the paving machine to automatically follow the precise path taken by the material transfer vehicle while maintaining a spacing between the material transfer vehicle and the paving machine that is within a predetermined interval. Thus, the travel commands for the paving machine are not determined by an operator on the paver, but are generated and implemented automatically by the controller on the paving machine.

Many prior art tracking systems require that components be installed on both the material transfer vehicle and the paving machine being supplied thereby. In addition, the sensor targets of prior art systems are typically reflectors, which often get dirty, making it difficult or impossible for the sensors to "see" the target. Furthermore, sensors that are mounted on the output end of the discharge conveyor of a material transfer vehicle are difficult to access for servicing.

Co-pending U.S. patent application Ser. No. 15/791,942, which is assigned to the assignee of this application, describes an apparatus for controlling the movement of a material transfer vehicle with respect to the front end of a paving machine that is being supplied by the material transfer vehicle. This apparatus includes a controller that is mounted on the material transfer vehicle and is operatively connected to control systems for the steering and drive (propulsion) systems of the material transfer vehicle. A paver-locating sensor is mounted on the material transfer vehicle and is operatively connected to the controller. The paver-locating sensor is located and adapted to execute multiple non-contact sensor scan passes across the front end of the paving machine to determine the distance from the sensor to the paving machine. The paver-locating sensor is also adapted to communicate information to the controller about the distance from the paver-locating sensor to the paving machine. The apparatus includes no components that are mounted on the paving machine.

It would be desirable if a system or combination of components for a material transfer vehicle could be provided for controlling the output end of the discharge conveyor that is used to supply asphalt paving material to a paving machine during a paving operation. It would also be desirable if such a system could be provided that would not require the installation of sensor targets on, or other modifications to, the paving machine. It would also be desirable if such a system could be provided that would not require the installation of sensors on the output end of the discharge conveyor of the material transfer vehicle. It would also be desirable if such a system could be provided that would not require the paving machine to precisely follow in the track of the material transfer vehicle in order to control the location of the discharge conveyor with respect to the hopper of the paving machine. Such a system would allow for variations in the positioning of a truck-receiving hopper of the material transfer vehicle with respect to the roadway on which the delivery trucks are constrained to travel, or for positioning a windrow pick-up head of a material transfer vehicle in order to pick up asphalt paving material that may not be in the lane being paved by the paving machine. Finally, it would be desirable if a system could be provided for controlling both the speed and steering of a material transfer vehicle with respect to a paving machine and the location of the output end of the discharge conveyor with respect to the hopper of the paving machine.

ADVANTAGES OF THE INVENTION

Among the advantages of the invention is that it provides a system for automatically controlling the location of the discharge conveyor of a material transfer vehicle with respect to an asphalt paving machine that is being supplied by the material transfer vehicle in order to keep the output end of the discharge conveyor aligned with the hopper of the asphalt paving machine. Still another advantage of the invention is that it provides such a system without requiring the installation of sensors on, or other modifications to, the paving machine. Yet another advantage of the invention is that it does not require the installation of sensor targets on any machine, or the installation of sensors on the output end of the discharge conveyor. Still another advantage of the invention is that it does not require the paving machine to precisely follow in the track of the material transfer vehicle. Another advantage of a preferred embodiment of the invention is that it provides a system for controlling both the location and speed of a material transfer vehicle with respect to a paving machine and the output end of the discharge conveyor of the material transfer vehicle with respect to the hopper of the paving machine. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship. Control devices may be "operatively connected" to components or systems by electrical, wireless signal transmission or hydraulic circuit connections, among others.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Various terms are specifically defined herein. These terms are to be given their broadest reasonable construction consistent with such definitions, as follows:

The term "asphalt paving material" refers to a mixture of asphalt binder and any of various aggregate materials which is used for paving purposes.

The terms "asphalt paving machine", "paving machine" and "paver" refer to a finishing machine for applying asphalt paving material to form an asphalt mat on a roadway, parking lot or similar surface. An asphalt paving machine is typically a self-propelled vehicle having a hopper at one end for receiving asphalt paving material and a floating screed at the other end for forming an asphalt mat.

The term "asphalt mat" refers to a layer of asphalt paving material such as is applied by an asphalt paving machine to produce a roadway, parking lot or similar surface.

The term "material transfer vehicle" refers to a vehicle that is adapted to receive asphalt paving material from a delivery truck or windrow and transfer it into the hopper of an asphalt paving machine. A material transfer vehicle includes a truck-receiving hopper that is adapted to receive asphalt paving material from a delivery truck or a windrow pick-up head that is adapted to pick up a quantity of asphalt paving material in a windrow on the roadway. A material transfer vehicle also includes a discharge conveyor that is pivotable about a substantially horizontal axis and about a substantially vertical axis, which discharge conveyor is adapted to discharge asphalt paving material into the hopper of an asphalt paving machine.

The terms "upper", "top" and similar terms, when used in reference to a relative position or direction on or with respect to a material transfer vehicle or a paving machine, or a component or portion of such a vehicle or machine, refer to a relative position or direction that is farther away from the surface on which the material transfer vehicle or paving machine is placed for operation.

The terms "lower", "bottom" and similar terms, when used in reference to a relative position or direction on or with respect to a material transfer vehicle or a paving machine, or a component or portion of such a vehicle or machine, refer to a relative position or direction that is nearer to the surface on which the material transfer vehicle or paving machine is placed for operation.

The term "front end" and similar terms, when used in connection with a material transfer vehicle or a component or portion of such a vehicle, refer to the leading end of the vehicle, or the component or portion thereof while the vehicle is moving with a paving machine and discharging asphalt material into the hopper of the paving machine. The term "front end" and similar terms, when used in connection with a paving machine or a component or portion of such a machine, refer to the leading end of the machine or the component or portion while the paving machine is carrying out a paving operation.

The terms "forward", "in front of", and similar terms, as used herein to describe a relative position or direction on or in connection with a material transfer vehicle or a paving machine, or a component or portion of such a vehicle or machine, refer to a relative position or direction towards the front end of the vehicle or machine.

The terms "back end", "rear end" and similar terms, when used in connection with a material transfer vehicle or a paving machine, or a component or portion of such a vehicle or machine, refer to the end of the vehicle or the paving machine, or the component or portion thereof which is farther from the front end of the vehicle or paving machine.

The terms "rearward", "behind", and similar terms, as used herein to describe a relative position or direction on or in connection with a material transfer vehicle or a paving machine, or a component or portion of such a vehicle or machine, refer to a relative position or direction towards the rear end of the vehicle or machine.

SUMMARY OF THE INVENTION

The invention comprises a material transfer vehicle that includes a system or combination of components for controlling the location of its discharge conveyor with respect to the hopper of an asphalt paving machine that is being supplied by the material transfer vehicle in order to keep the output end of the discharge conveyor aligned with the hopper. The system includes no sensor targets or other components that are mounted on the asphalt paving machine. Instead, the preferred combination includes a paver-locating sensor and a controller that are mounted on the material transfer vehicle. The paver-locating sensor is operatively connected to the controller. The controller is also operatively connected to the steering and elevation control systems for the discharge conveyor of the material transfer vehicle and is adapted to send signals to the steering and elevation control systems to control and/or adjust the position of the output end of the discharge conveyor with respect to the hopper of the asphalt paving machine in order to maintain the output end of the discharge conveyor in a desired position with respect to the hopper. The paver-locating sensor is adapted to execute multiple sensor scan passes across the front of the paving machine. Preferably, each scan in a scan pass is directed towards the paving machine at a different angle with respect to the longitudinal axis of the material transfer vehicle from that of the other scans in the pass. These scans provide feedback information about the distance from the paver-locating sensor to the various components and surfaces on the front of the paving machine.

When it is desired to begin the paving operation, the material transfer vehicle operator will position the vehicle in a desired location at the proper spacing from, and orientation with respect to, the paving machine. The operator will activate the paver-locating sensor to calibrate the control system by emitting scans at a plurality of different angles towards and across the front of the paving machine. The system will store the distances measured by the plurality of scans in the controller's memory as baseline points. When the paving machine begins paving operations, the paver-locating sensor will continuously scan the front of the paving machine and will compare the instantaneous readings obtained with the baseline points stored in the controller's memory. The controller will automatically communicate with the steering and elevation control systems for the discharge conveyor of the material transfer vehicle and will cause these systems to maintain the orientation necessary to locate the output end of the discharge conveyor over the hopper of the paving machine as the paving operation is carried out.

In order to facilitate an understanding of the invention, the preferred embodiments of the invention, as well as the best mode known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the inventions are illustrated in the accompanying drawings, in which like reference numerals represent like parts throughout, and wherein.

Figure 1:
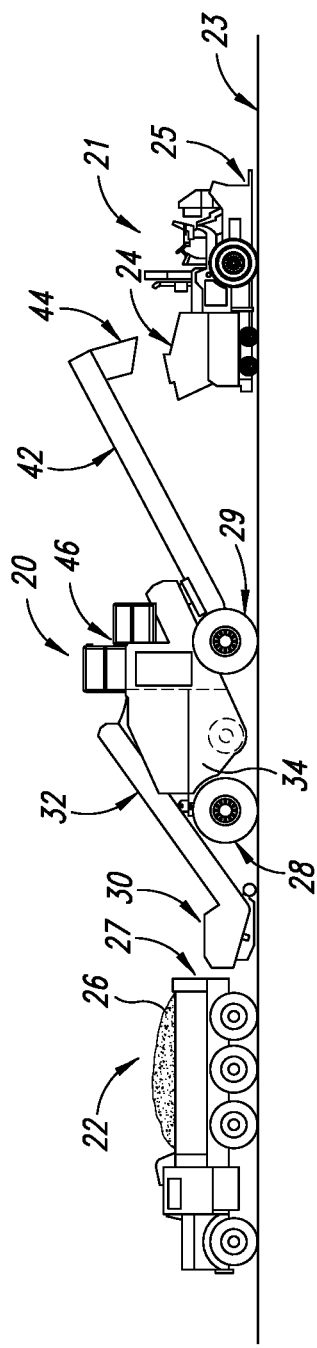
FIG. 1 is a side view of a conventional material transfer vehicle in association with a supply truck for asphalt paving material and an asphalt paving machine.

DESCRIPTION OF THE PREFERRED
EMBODIMENTS OF THE INVENTION

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, a conventional self-propelled material transfer vehicle 20 is positioned adjacent to and between conventional asphalt paving machine 21 and conventional supply truck 22 for asphalt paving material. Paving machine 21 may be operated to pave roadway 23 in a direction from right to left, as shown in FIG. 1. Paving machine 21 includes hopper 24 at its front end and floating screed 25 at its rear end. Paving machine 21 also includes a conventional conveyor system comprising longitudinally disposed conveyors (not shown) for delivering the asphalt paving material from hopper 24 to a transversely disposed distributing auger (also not shown), so that the distributing auger may distribute the asphalt paving material across the surface of the roadway to be paved in front of screed 25.

Conventional supply truck 22 includes a pivotally mounted bed 26 with a tailgate 27, and is adapted to deliver asphalt paving material from a remote source to material transfer vehicle 20. Preferably, the supply truck delivers the asphalt paving material to the material transfer vehicle at a convenient location remote from the paving machine, and then the material transfer vehicle transports the asphalt paving material to the paving location for discharge into paving machine hopper 24. Thus, material transfer vehicle 20 is adapted to shuttle between asphalt supply trucks at an asphalt-receiving location and a paving machine that is engaged in paving a roadway.

Figure 3:
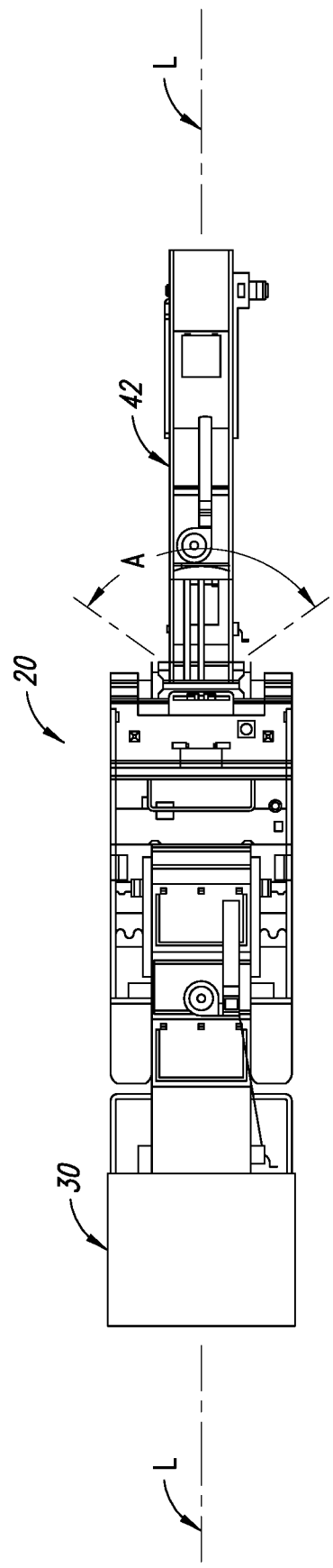
FIG. 3 is a top view of the material transfer vehicle shown in FIGS. 1 and 2.
Figure 2:
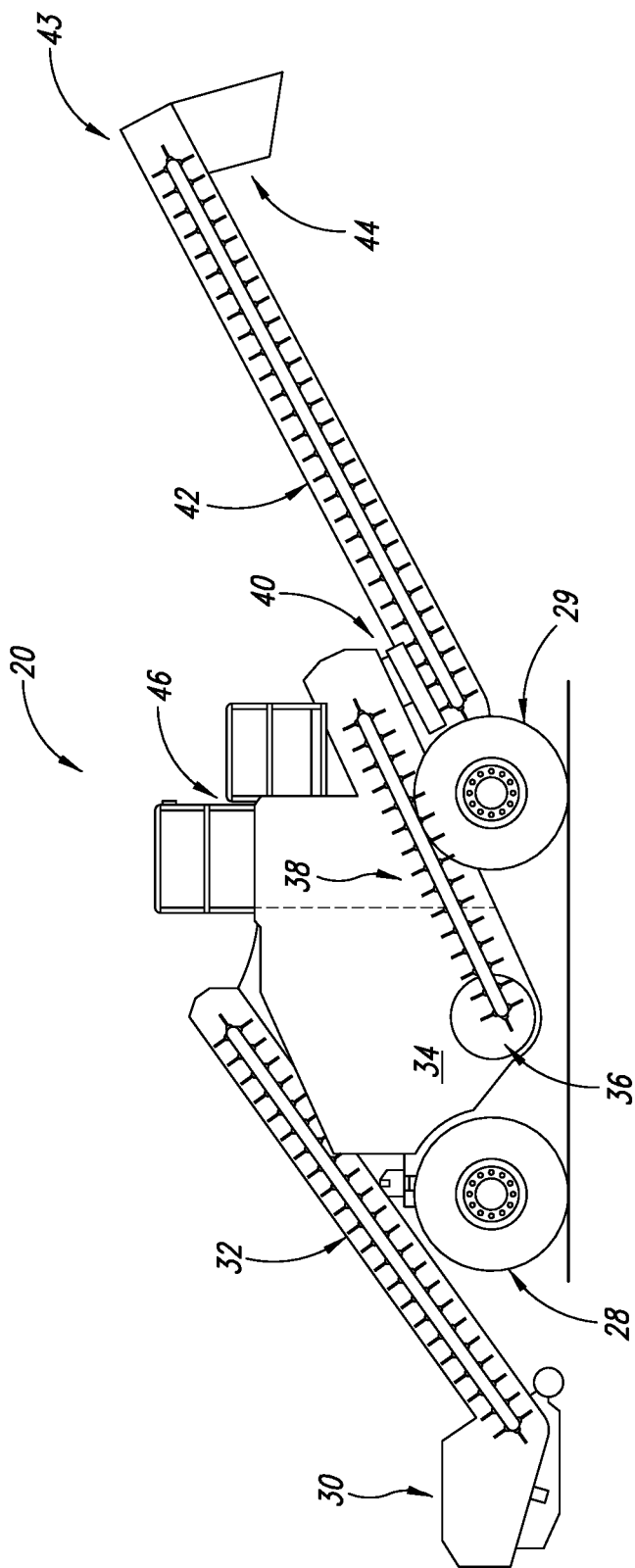
FIG. 2 is a partial sectional view of the material transfer vehicle shown in FIG. 1.

Material transfer vehicle 20 includes a frame that is supported on the roadway surface by front wheel set 28 and rear wheel set 29. Each of the wheel sets is driven by one or more hydraulic motors (not shown) that are supplied with fluid under pressure by one or more hydraulic pumps (also not shown) in a conventional hydraulic circuit. Preferably, front wheel set 28 is steerable by a vehicle operator in a manner known to those having ordinary skill in the art to which the invention relates in order to provide control for the direction of travel of the material transfer vehicle. Vehicle 20 includes truck-receiving hopper 30 for receiving asphalt paving material from delivery truck 22. Other material transfer vehicles (not shown) may include a windrow pick-up head instead of the truck-receiving hopper. Vehicle 20 also includes truck-unloading conveyor 32 for conveying asphalt paving material from truck-receiving hopper 30 to surge bin 34. The surge bin includes transverse auger 36 (shown in FIG. 2) that is employed to mix the asphalt paving material in the surge bin in order to minimize segregation or separation of the aggregate portion of the asphalt paving material by size. Also located in the surge bin is surge conveyor 38, which is adapted to convey asphalt paving material out of the surge bin to chute 40 which is associated with discharge conveyor 42. Asphalt paving material conveyed out of the surge bin by conveyor 38 falls through chute 40 and onto the input end of discharge conveyor 42. Discharge conveyor 42 is mounted for pivotal movement about a substantially horizontal pivot axis at its input end by operation of an elevation control system comprising one or more conventional linear actuators (not shown), which may be operated to raise and lower output end 43. Discharge conveyor 42 is also adapted for side-to-side movement about a substantially vertical axis (perpendicular to the plane of the paper on which FIG. 3 is shown) through an angle "A" of about 110° (55° on either side of longitudinal axis "L" of material transfer vehicle 20) by operation of a steering control system comprising one or more conventional hydraulic motors or actuators (also not shown). Asphalt paving material that falls through chute 40 onto the input end of discharge conveyor 42 is discharged off output end 43 through discharge chute 44 into hopper 24 of paving machine 21. Hydraulic drive systems including hydraulic pumps and hydraulic motors are provided to drive transverse auger 36 and the various conveyors and actuators, and an engine (not shown) provides the motive force for the hydraulic pumps that drive the hydraulic motors for the wheel sets, the transverse auger and the various conveyors and other components of the vehicle. Vehicle 20 is operated by an operator located at operator station 46.

Figure 6:
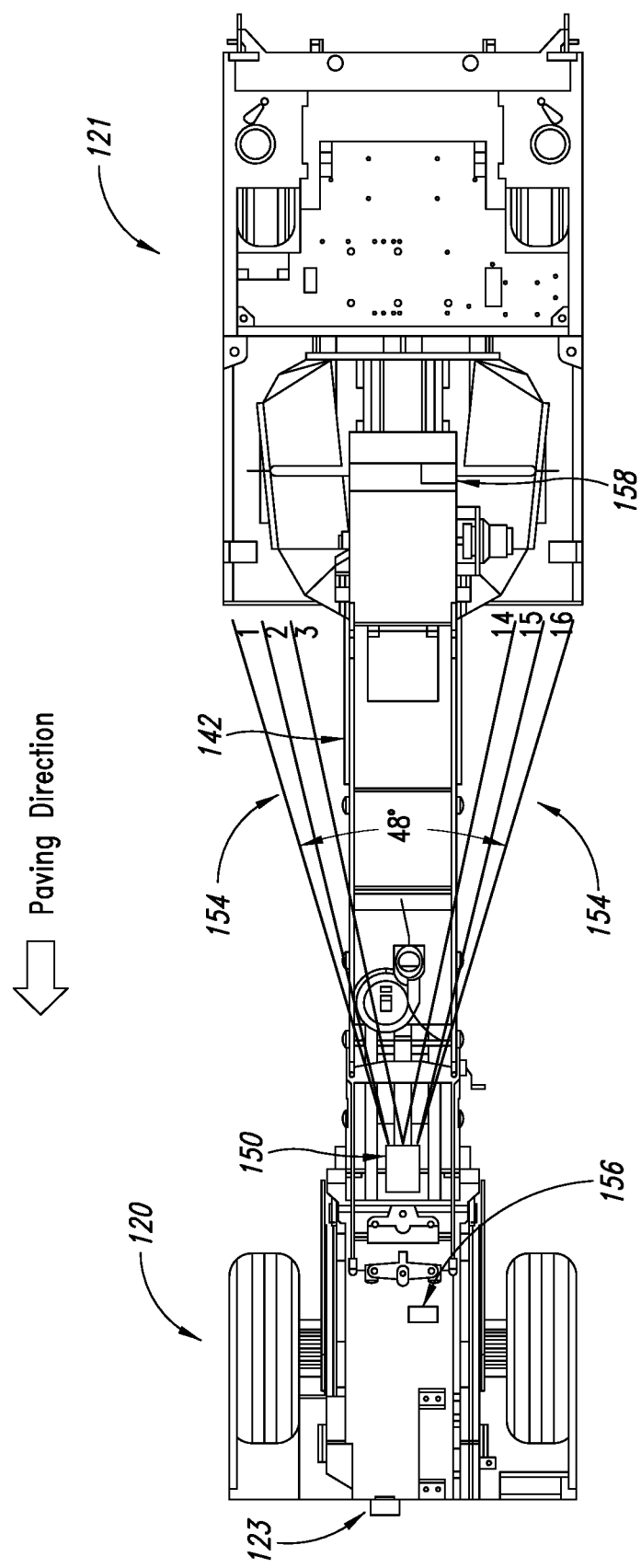
FIG. 6 is a top view of the portion of the material transfer vehicle and the portion of the paving machine illustrated in FIGS. 4 and 5.
Figure 7:
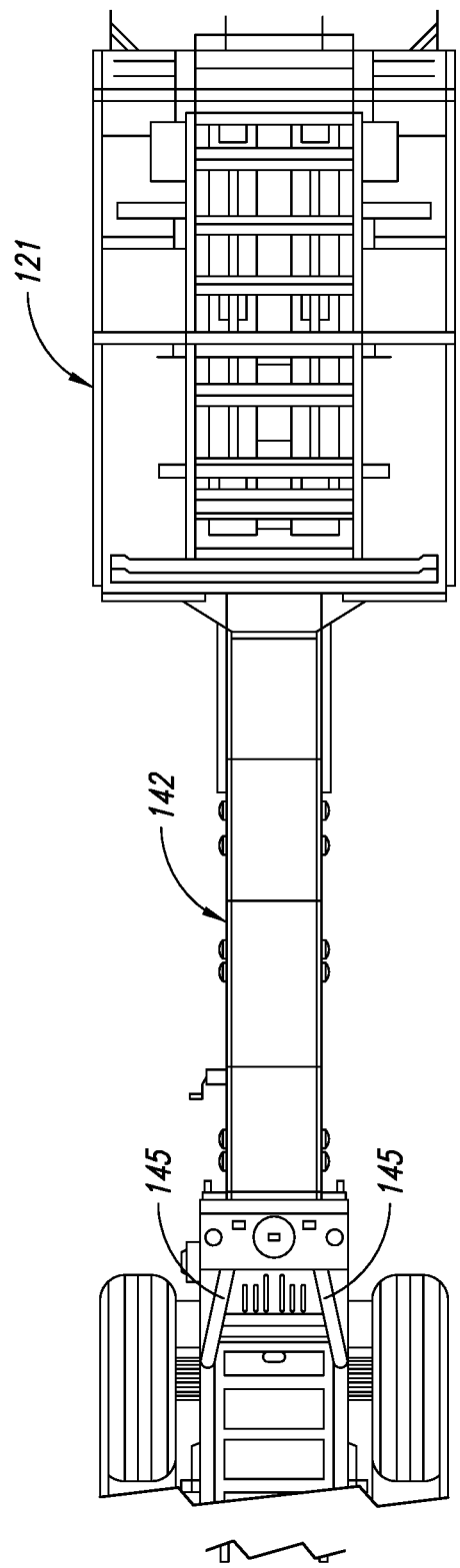
FIG. 7 is a bottom view of the portion of the material transfer vehicle and the portion of the paving machine illustrated in FIGS. 4-6.

A portion of a material transfer vehicle that is adapted to supply asphalt paving material to a paving machine according to a first embodiment of the invention is shown in FIGS. 4-7. This embodiment of the invention locates the paver-locating sensor in a first location and includes a pair of status light assemblies (discussed in some detail hereinafter). As shown in these drawings, material transfer vehicle 120 is substantially similar to material transfer vehicle 20. It includes surge conveyor 138, which is adapted to convey asphalt paving material out of the surge bin (not shown) to chute 140 which is associated with discharge conveyor 142. Asphalt paving material conveyed out of the surge bin by conveyor 138 falls through chute 140 and onto discharge conveyor 142. Discharge conveyor 142 is mounted for pivotal movement about a substantially horizontal pivot axis at its input end 143 as raised and lowered by an elevation control system comprising linear actuator 144 (shown in FIG. 5). Discharge conveyor 142 is also adapted for side-to-side movement about a substantially vertical axis (perpendicular to the plane of the paper on which FIGS. 6 and 7 are shown) through an angle of about 110° (similar to the steering range of discharge conveyor 42 of material transfer vehicle 20) with respect to the longitudinal axis of material transfer vehicle 120 by operation of a steering control system comprising one or more hydraulic motors, or a pair of actuators 145 (shown in FIG. 7). Asphalt paving material that falls through chute 140 onto input end 143 of discharge conveyor 142 is discharged off output end 146 through discharge chute 147 at the front end of paving machine 121. Paving machine 121 also includes a floating screed (not shown) at its rear end, and a conventional conveyor system comprising longitudinally disposed conveyors (not shown) for delivering the asphalt paving material from hopper 124 to a transversely disposed distributing auger (also not shown) that distributes the asphalt paving material across the roadway to be paved ahead of the screed.

Material transfer vehicle 120 also includes an operator's platform (not shown, but substantially the same as operator's platform 46 of vehicle 20) on which is mounted controller 123 of the invention. Controller 123 may embody a single microprocessor or multiple microprocessors that include components for controlling the invention and other operations of material transfer vehicle 120 based on input from an operator of the material transfer vehicle and on sensed or other known or predetermined operational parameters. Controller 123 includes a memory component and suitable software and software algorithms for calculating steering and elevation adjustments for discharge conveyor 142. In addition, controller preferably includes suitable software and software algorithms for calculating steering and speed adjustments for the material transfer vehicle. Controller 123 may include or be associated with a data input component such as a touch screen and/or a plurality of actuating buttons, a secondary storage device, a processor and other components for running an application. Various circuits may be associated with and operatively connected to controller 123, such as power supply circuitry and hydraulic circuitry. Numerous commercially available microprocessors can be configured to perform the functions of controller 123. It should be appreciated that controller 123 could readily be embodied in a general purpose computer or machine microprocessor capable of controlling numerous material transfer vehicle functions.

Controller 123 is operatively connected to conventional control systems (such as one or more components of a hydraulic circuit) for linear actuator 144 of the elevation control system and to conventional control systems (such as one or more components of a hydraulic circuit) for linear actuators 145 of the steering control system. In addition, controller 123 is connected to conventional feedback mechanisms in linear actuator 144, such as string pots or linear transducers contained in the linear actuators, to provide information to the controller about the elevation of discharge conveyor 142. Similarly, controller 123 is connected to conventional feedback mechanisms in linear actuators 145, such as string pots or linear transducers contained in the linear actuators, to provide information to the controller about the angular (or steering) orientation of discharge conveyor 142 with respect to the longitudinal axis of material transfer vehicle 120.

Controller 123 is adapted to determine elevation control adjustment signals for communication to the elevation control system for the discharge conveyor in order to maintain the elevation of the discharge conveyor within a predetermined elevation window, and it is adapted to communicate the elevation control adjustment signals to the elevation control system for the discharge conveyor so that the elevation of the discharge conveyor may be adjusted based upon communication from the controller in order to maintain the elevation of the discharge conveyor within the predetermined elevation window. In addition, controller 123 is adapted to determine steering control adjustment signals for communication to the steering control system for the discharge conveyor in order to maintain the angular orientation of the discharge conveyor with respect to the longitudinal axis of the material transfer vehicle within a predetermined steering window, and it is adapted to communicate steering control adjustment signals to the steering control system for the discharge conveyor so that the angular orientation of the discharge conveyor with respect to the longitudinal axis of the material transfer vehicle may be adjusted based upon communication from the controller in order to maintain the angular orientation of the discharge conveyor within the predetermined steering window;

As is conventional, material transfer vehicle 120 includes a propulsion control system that drives the material transfer vehicle along the roadway, and a steering control system that steers the material transfer vehicle on the roadway. In a preferred embodiment of the invention, controller 123 is also connected to a conventional speed sensor for determining the speed of the material transfer vehicle 120 along the roadway, and to a conventional steering sensor for determining the steering angle of the front wheel set of the material transfer vehicle. In this embodiment of the invention, controller 123 will also be connected to the conventional speed control mechanisms and conventional steering mechanisms so that it may control the speed and steering angle (or direction of travel) of material transfer vehicle 123 based on sensed and/or operator input information. In this embodiment of the invention, controller 123 is adapted to communicate speed control signals to the propulsion control system for material transfer vehicle 120 so that the speed of the material transfer vehicle may be adjusted based upon communication from the controller. Furthermore, controller 123 is also adapted to communicate steering control signals to the steering control system for the material transfer vehicle so that the steering angle of the front wheel set, and thus the direction of the material transfer vehicle on the roadway, may be adjusted based upon communication from the controller.

Figure 4:
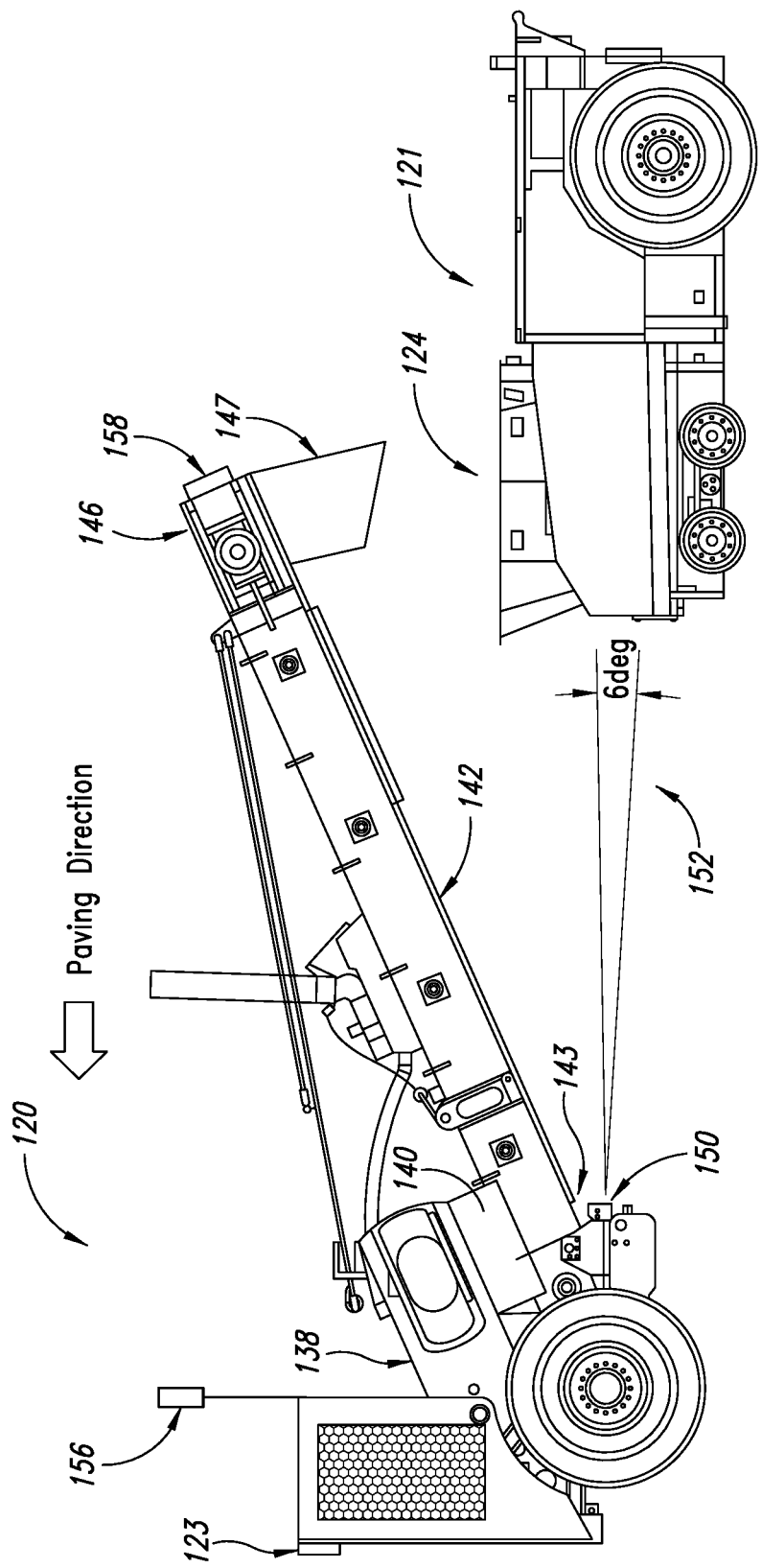
FIG. 4 is a side view of a portion of a material transfer vehicle that is equipped with the invention including a paver-locating sensor in a first position and a pair of status light assemblies, and a portion of a paving machine that is located so as to be supplied by the material transfer vehicle.
Figure 5:
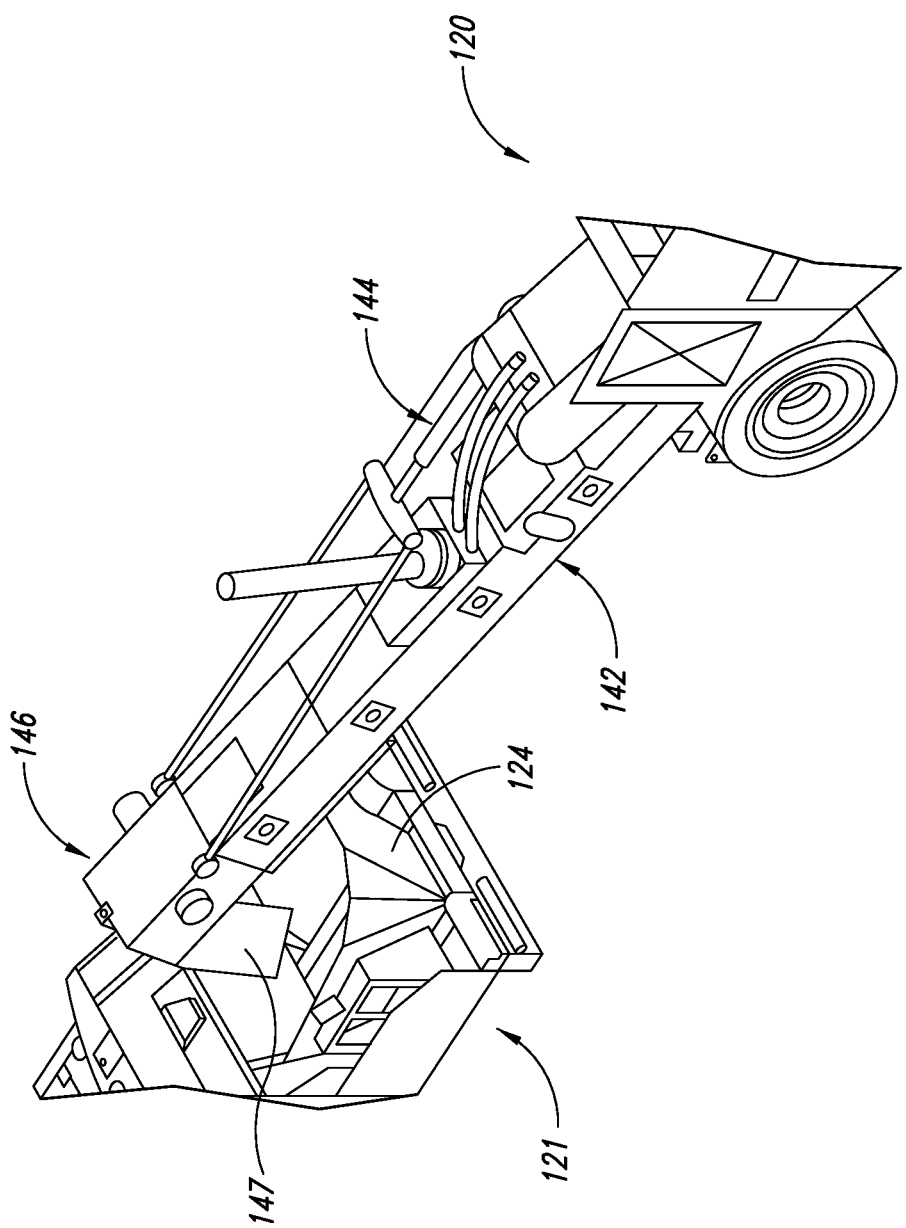
FIG. 5 is a perspective view of the portion of the material transfer vehicle and paving machine shown in FIG. 4.

As shown in FIGS. 4 and 6, paver-locating sensor 150 is mounted to the lower side of discharge conveyor 142 near its input end 143. This location places paver-locating sensor 150 high enough off the roadway to be protected from road hazards, but low enough to be easily accessible and to avoid interference caused by fumes emanating from the asphalt paving material being handled by material transfer vehicle 120 and paving machine 121. Paver-locating sensor 150 is operatively connected to controller 123 and is adapted to execute multiple sensor scan passes, preferably sixteen scans in each pass, across the front of paving machine 121. Preferably, paver-locating sensor 150 is an IS16Industrial Leddar™ sensor that is supplied by LeddarTech, Inc. of Quebec City, Canada. This sensor emits LED light in either the visible or the infrared spectrum, preferably within an adjustable vertical band 152 of about 6°, as shown in FIG. 4, across an adjustable horizontal band 154 of up to about 48°, as shown in FIG. 6, towards the front end of paving machine 121. The paver-locating sensor is adapted to execute multiple sensor scan passes, with each scan in a pass being directed to the paving machine at a different angle with respect to the longitudinal axis of the material transfer vehicle from that of the other scans in the pass. Thus, for example, as shown in FIG. 6, scan 1 is oriented at a larger angle with respect to the longitudinal axis of material transfer vehicle 120 than is scan 2, and scan 2 is oriented at a larger angle with respect to the longitudinal axis of material transfer vehicle 120 than is scan 3. Similarly, scan 16 is oriented at a larger angle with respect to the longitudinal axis of material transfer vehicle 120 than is scan 15, and scan 15 is oriented at a larger angle with respect to the longitudinal axis of material transfer vehicle 120 than is scan 14. These scans provide feedback information about the distance from the paver-locating sensor to the various components and surfaces on the front of the paving machine, and they require no target components such as are common in the prior art to be mounted on the paving machine. Preferably, the paver-locating sensor comprises a light-emitting component, and a light-receiving component comprising a multi-channel photodetector array that collects the backscatter of the emitted light from the light-emitting component and measures the time taken for the emitted light to return to the light-receiving component. Controller 123 uses the measurement of time taken for the emitted light to return to the light-receiving component of the paver-locating sensor to determine the distance from the paver-locating sensor to various features on the front end of paving machine 121.

Controller 123 is preferably programmed with predetermined variances by which the discharge conveyor may vary in elevation and angular (steering) orientation from the desired values obtained by operator input in the calibration step (described below). In the alternative, the operator may input desired variances into the memory for controller 123. Controller 123 is adapted to transmit steering and elevation signals to the steering control and elevation control systems for discharge conveyor 142 in order to cause discharge chute 147 on output end 146 of the discharge conveyor to remain within a predetermined elevation window and a predetermined steering window with respect to hopper 124 of paving machine 121 as the two machines move in a paving operation. When the material transfer vehicle enters a curve in the roadway, for example, controller 123 will cause the steering and elevation control systems for discharge conveyor 142 to make the necessary adjustments to maintain discharge conveyor 142 within the desired elevation and steering windows so that discharge chute 147 will remain in position over hopper 124 of the paving machine.

When it is desired to begin the paving operation, the operator of material transfer vehicle 120 will position the vehicle in the desired location with the proper spacing from paving machine 121 and with discharge chute 147 located over hopper 124 of the paving machine in the desired position. The operator will activate paver-locating sensor 150 to calibrate the system by executing a scan pass comprising the emission of light at a plurality of different angular orientations across the front of the paving machine. The controller will store the distances measured by the plurality of scans in the controller's memory as baseline points, and the controller will record and store the baseline elevational and steering orientation of discharge conveyor 142. When the paving machine begins paving operations, the paver-locating sensor will continuously scan the front of the paving machine with multiple scan passes and will compare the instantaneous readings obtained with the baseline points stored in the controller's memory. Controller 123 will automatically communicate with the steering and elevation control systems for the discharge conveyor of the material transfer vehicle and will cause these control systems to maintain the predetermined baseline angular (steering) orientation and elevation with respect to the hopper of the paving machine during the paving operation.

In a preferred embodiment of the invention, controller 123 will also communicate with the conventional propulsion control system that drives the material transfer vehicle along the roadway and with the conventional steering control system that steers the material transfer vehicle on the roadway. In this embodiment of the invention, controller 123 is operatively connected to the propulsion control system and the steering control system for the material transfer vehicle. Controller 123 is adapted to determine speed control adjustment signals for communication to the propulsion control system for the material transfer vehicle in order to maintain the location of the material transfer vehicle within a predetermined distance window from the paving machine. The controller is also adapted to communicate the speed control adjustment signals to the propulsion control system for the material transfer vehicle so that the speed of the material transfer vehicle with respect to the paving machine may be adjusted based upon communication from the controller in order to maintain the material transfer vehicle within the predetermined distance window from the paving machine. In addition, controller 123 is adapted to determine steering control adjustment signals for communication to the steering control system for the material transfer vehicle in order to maintain the direction of the material transfer vehicle on the roadway within a predetermined steering window, and it is adapted to communicate the steering control adjustment signals to the steering control system for the material transfer vehicle so that the direction of the material transfer vehicle on the roadway may be adjusted based upon communication from the controller in order to maintain the direction of the material transfer vehicle within the predetermined steering window. In this embodiment of the invention, controller 123 is also programmed with predetermined variances by which by which the material transfer vehicle may vary from the desired values for angular alignment from the centerline of the paving machine and spacing from the front end of the paving machine obtained by operator input in the calibration step (described below). In the alternative, the operator may input desired variances into the memory for the controller.

Thus, in this embodiment of the invention, the speed and steering of the material transfer vehicle is tied to the movement of the paving machine. When the paving machine changes speeds or direction, controller 123 will cause the material transfer vehicle to change its speed or direction to remain within the preselected window that includes the predetermined desired angular alignment and spacing from the paving machine. If the sensor link between the material transfer vehicle and the paving machine is completely interrupted for any reason, so that paver-locating sensor 150 is unable to locate the front end of the paving machine, a preferred embodiment of the controller will bring the material transfer vehicle to a stop.

As the paver-locating sensor continues to scan the front of the paving machine during paving, it is possible that fumes emanating from the asphalt paving material, or the movement of paving workers adjacent to paving machine 121, may interrupt some of the scans of the paver-locating sensor across the front of paving machine 121. However, by providing multiple scans in each pass, the system is able to locate the paving machine and properly place the discharge conveyor of the material transfer vehicle with respect to the hopper of paving machine 121 and, if desired, the material transfer vehicle itself with respect to the paving machine, even if some of the scans are interrupted.

Figure 8:
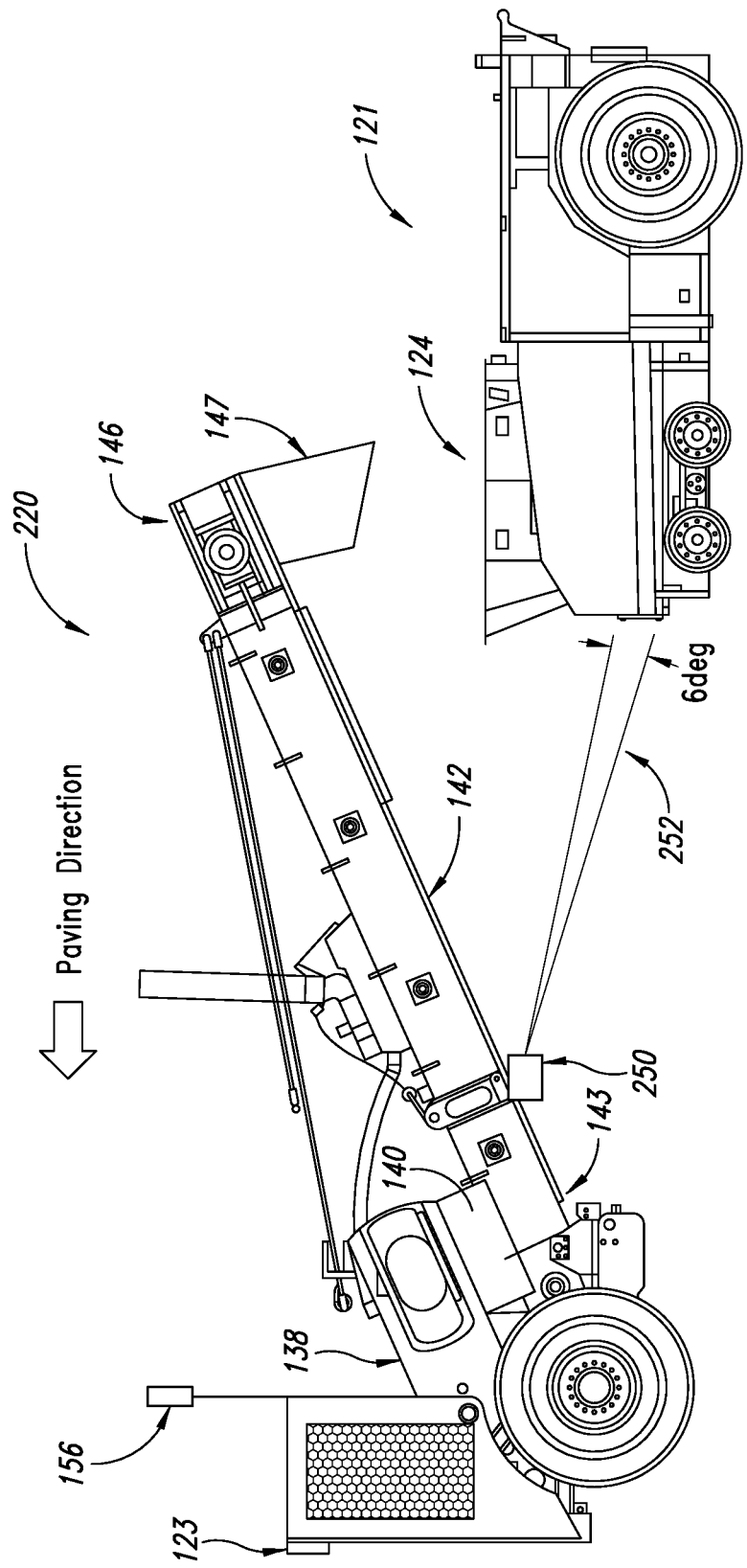
FIG. 8 is a side view of a portion of a material transfer vehicle that is equipped with the invention including a paver-locating sensor in a second position and a single status light assembly, and a portion of a paving machine that is located so as to be supplied by the material transfer vehicle.
Figure 9:
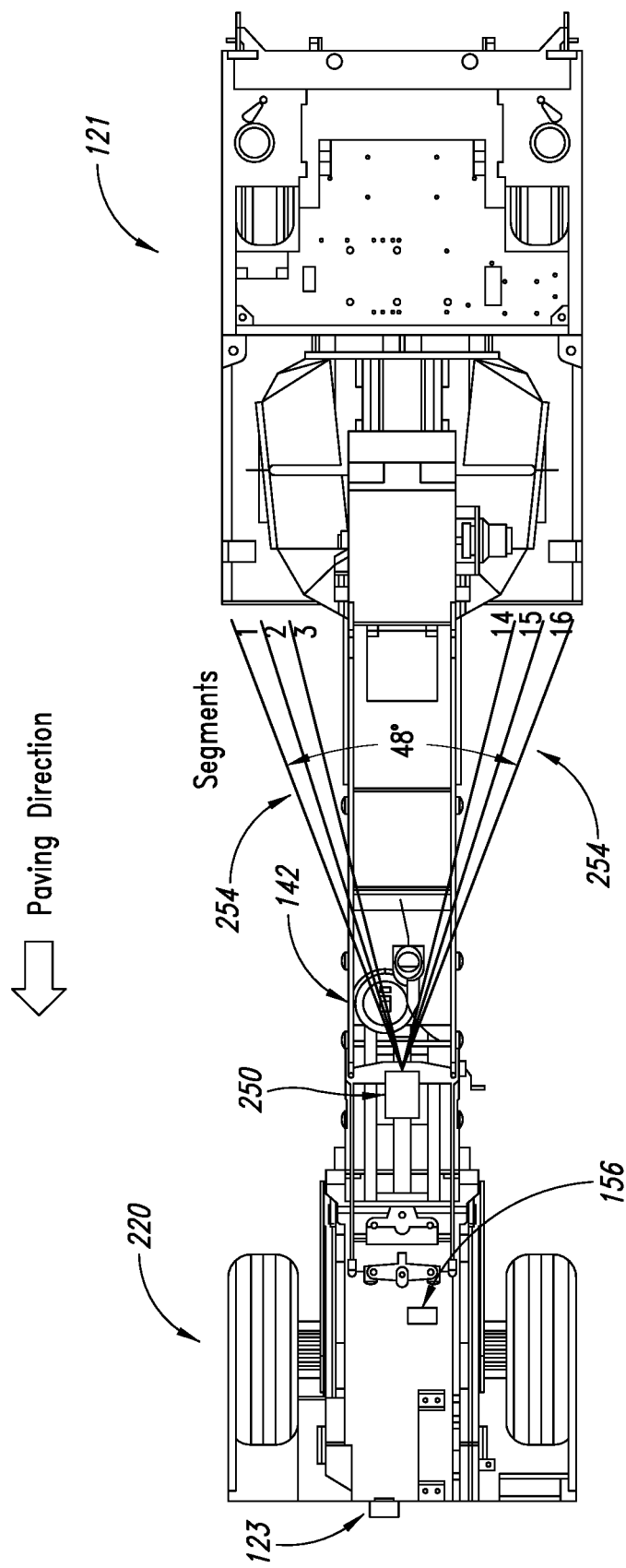
FIG. 9 is a top view of the portion of the material transfer vehicle and the portion of the paving machine illustrated in FIG. 8.

A portion of a material transfer vehicle that is adapted to supply asphalt paving material to a paving machine according to a second embodiment of the invention is shown in FIGS. 8 and 9. This embodiment of the invention locates the paver-locating sensor in a second location and includes a single status light assembly. As shown in these drawings, material transfer vehicle 220 is substantially similar to material transfer vehicle 20, and except for the location of the paver-locating sensor and the status light configuration, it is substantially similar to material transfer vehicle 120. It includes surge conveyor 138, which is adapted to convey asphalt paving material out of the surge bin (not shown) to chute 140 which is associated with discharge conveyor 142. Asphalt paving material conveyed out of the surge bin by conveyor 138 falls through chute 140 and onto discharge conveyor 142. Discharge conveyor 142 is mounted for pivotal movement about a substantially horizontal pivot axis at its input end 143 as raised and lowered by an elevation control system comprising one or more conventional linear actuators (not shown, but substantially similar to linear actuator 144 on vehicle 120). Discharge conveyor 142 is also adapted for side-to-side movement about a substantially vertical axis (perpendicular to the plane of the paper on which FIG. 9 is shown) through an angle of about 110° with respect to the longitudinal axis of material transfer vehicle 220 by operation of a steering control system comprising one or more conventional linear actuators (also not shown, but substantially similar to linear actuators 145 on vehicle 120). Asphalt paving material that falls through chute 140 onto input end 143 of discharge conveyor 142 is discharged off output end 146 through discharge chute 147 into hopper 124 at the front end of paving machine 121.

Material transfer vehicle 220 also includes an operator's platform (not shown, but substantially the same as operator's platform 46 of vehicle 20) on which is mounted controller 123 of the invention. Material transfer vehicle 220 also includes paver-locating sensor 250 which is mounted on the lower side of paver-loading conveyor 142 at a location that is higher than the location of paver-locating sensor 150 on material transfer vehicle 120. Paver-locating sensor 250 is operatively connected to controller 123, and except for its location, is identical to paver-locating sensor 150. Thus, paver-locating sensor 250 is adapted to execute multiple non-contact sensor scan passes, preferably sixteen scans in each pass, across the front of paving machine 121. Preferably, paver-locating sensor 250 is an IS16 Industrial Leddar™ sensor that is supplied by LeddarTech, Inc. of Quebec City, Canada. This sensor emits LED light in either the visible or the infrared spectrum, preferably within an adjustable vertical band 252 of about 6°, as shown in FIG. 8, across an adjustable horizontal band 254 of up to about 48°, as shown in FIG. 9, towards the front end of paving machine 121. The paver-locating sensor is adapted to execute multiple sensor scan passes, with each scan in a pass being directed towards the paving machine at a different angle with respect to the longitudinal axis of the material transfer vehicle from that of the other scans in the pass. Thus, for example, as shown in FIG. 9, scan 1 is oriented at a larger angle with respect to the longitudinal axis of material transfer vehicle 220 than is scan 2, and scan 2 is oriented at a larger angle with respect to the longitudinal axis of material transfer vehicle 220 than is scan 3. Similarly, scan 16 is oriented at a larger angle with respect to the longitudinal axis of material transfer vehicle 220 than is scan 15, and scan 15 is oriented at a larger angle with respect to the longitudinal axis of material transfer vehicle 220 than is scan 14. These scans provide feedback information about the distance from the paver-locating sensor to the various components and surfaces on the front of the paving machine, and they require no target components such as are common in the prior art to be located on the paving machine. Preferably, the paver-locating sensor comprises a light-emitting component, and a light-receiving component comprising a multi-channel photodetector array that collects the backscatter of the emitted light from the light-emitting component and measures the time taken for the emitted light to return to the light-receiving component. Controller 123 uses the measurement of time taken for the emitted light to return to the light-receiving component of the paver-locating sensor to determine the distance from the paver-locating sensor to various features on the front end of paving machine 121.

When it is desired to begin the paving operation, the operator of material transfer vehicle 220 will position the vehicle in the desired location with the proper spacing from paving machine 121 and with discharge chute 147 located over hopper 124 of the paving machine in the desired position. The operator will activate paver-locating sensor 250 to calibrate the system by executing a scan pass comprising the emission of light in a plurality of different angular orientations across the front of the paving machine. The controller will store the distances measured by the plurality of scans in the controller's memory as baseline points, and the controller will record and store the baseline elevational and steering orientation of discharge conveyor 142. When the paving machine begins paving operations, the paver-locating sensor will continuously scan the front of the paving machine with multiple scan passes and will compare the instantaneous readings obtained with the baseline points stored in the controller's memory. Controller 123 will automatically communicate with the steering and elevation control systems for the discharge conveyor of the material transfer vehicle and will cause these control systems to maintain the necessary elevation and steering configurations with respect to the hopper of the paving machine to maintain discharge chute 147 in a position over the hopper of the paving machine during the paving operation. In a preferred embodiment of the invention, controller 123 will also communicate with the speed and steering control systems for material transfer vehicle 220 and will cause these systems to maintain the predetermined baseline distance and orientation with respect to the paving machine during the paving operation. As the paver-locating sensor continues to scan the front of the paving machine during paving, it is possible that fumes emanating from the asphalt paving material, or the movement of paving workers adjacent to paving machine 121, may interrupt some of the scans of the paver-locating sensor across the front of paving machine 121. However, by providing multiple scans in each pass, the system is able to locate the paving machine and properly place the discharge conveyor of the material transfer vehicle with respect to the hopper of paving machine 121 and, if desired, the material transfer vehicle itself with respect to the paving machine, even if some of the scans are interrupted.

Figure 10:
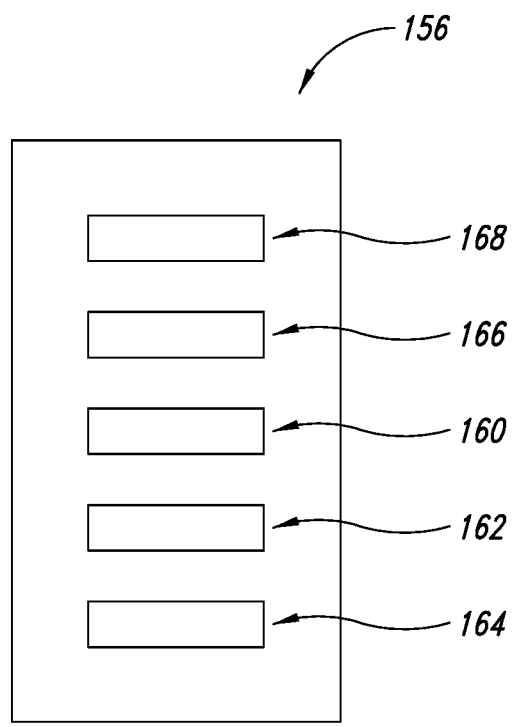
FIG. 10 is a front view of a status light assembly of a preferred embodiment of the invention.

In a preferred embodiment of the invention, status light assemblies 156 and 158 on material transfer vehicle 120, or status light assembly 156 on material transfer vehicle 220 are operatively connected to controller 123 so that the controller may selectively illuminate the status lights on each status light assembly to alert the operator of the material transfer vehicle and the crew operating the paving machine if the material transfer vehicle is or is not at the predetermined baseline distance and orientation with respect to the paving machine. FIG. 10 illustrates a preferred embodiment of the various lights on status light assembly 156, which is essentially identical to status light assembly 158. In the embodiment of FIGS. 4-7 which includes a pair of status light assemblies, status light assemblies 156 and 158 are coordinated so that the controller will illuminate each corresponding light on each assembly at the same time.

Controller 123 is adapted to send signals to illuminate the status lights on each status light assembly based upon the controller's determination of the location of the material transfer vehicle with respect to the paving machine. Thus, in a preferred embodiment of the invention, controller 123 will illuminate status lights 160, preferably green lights, on each light assembly when paver-locating sensor 150 or paver-locating sensor 250 has communicated to the controller that the material transfer vehicle is within a predetermined window that includes the predetermined baseline distance and orientation with respect to the paving machine. The controller will illuminate lower status lights 162, preferably yellow lights, when the material transfer vehicle is in the predetermined window but drifting towards the paving machine, and will illuminate lower lights 164, preferably red lights, when the material transfer vehicle is closer than the predetermined window from the paving machine. Similarly, controller 123 will illuminate upper lights 166, preferably yellow lights, when the material transfer vehicle is within the predetermined window, but drifting away from the paving machine, and will illuminate upper lights 168, preferably red lights, when the material transfer vehicle is farther away from the predetermined window from the paving machine.

The invention thus provides a system for automatically controlling the location of the discharge conveyor of a material transfer vehicle with respect to an asphalt paving machine that is being supplied by the material transfer vehicle in order to keep the output end of the discharge conveyor aligned with the hopper of the asphalt paving machine without requiring the installation of tracking components on both the material transfer vehicle and the paving machine. Furthermore, the invention does not require the installation of sensor targets on any machine, or the installation of sensors on the discharge end of the paver-loading conveyor. Finally, the invention does not require the paving machine to precisely follow in the track of the material transfer vehicle as the material transfer vehicle supplies the paving machine with asphalt paving material during a paving operation. In addition, by employing a paver-locating sensor that executes multiple non-contact sensor scan passes across the front end of the paving machine, the invention is more likely than prior art scanning systems to accurately determine the location and orientation of the paving machine with respect to the material transfer vehicle in spite of the presence of fumes, smoke or other signal blockers that may occur from time to time during the paving operation.

Although this description contains many specifics, these should not be construed as limiting the scope of the invention but as merely providing illustrations of the presently preferred embodiments thereof, as well as the best mode contemplated by the inventors of carrying out the invention. The invention, as described herein, is susceptible to various modifications and adaptations, as would be understood by those having ordinary skill in the art to which the invention relates.

What is claimed is:

1. A material transfer vehicle that is adapted to supply asphalt paving material to a paving machine on a roadway, said material transfer vehicle having a longitudinal axis and further comprising:
   (a) a discharge conveyor:
      (i) having an input end;
      (ii) having an output end with a discharge chute mounted thereon;
      (iii) which is mounted for pivotal movement about a substantially horizontal pivot axis at its input end as raised and lowered by an elevation control system;
      (iv) which is adapted for side-to-side movement with respect to the longitudinal axis of the material transfer vehicle, about a substantially vertical pivot axis, by operation of a steering control system;
   (b) a controller that is:
      (i) operatively connected to the elevation control system and the steering control system for the discharge conveyor;
      (ii) adapted to determine elevation control adjustment signals for communication to the elevation control system for the discharge conveyor in order to maintain an elevation of the discharge conveyor within a predetermined elevation window;
      (iii) adapted to communicate the elevation control adjustment signals to the elevation control system for the discharge conveyor so that the elevation of the discharge conveyor may be adjusted based upon communication from the controller in order to maintain the elevation of the discharge conveyor within the predetermined elevation window;
      (iv) adapted to determine steering control adjustment signals for communication to the steering control system for the discharge conveyor in order to maintain an angular orientation of the discharge conveyor with respect to the longitudinal axis of the material transfer vehicle within a predetermined steering window;
      (v) adapted to communicate the steering control adjustment signals to the steering control system for the discharge conveyor so that the angular orientation of the discharge conveyor with respect to the longitudinal axis of the material transfer vehicle may be adjusted based upon communication from the controller in order to maintain the angular orientation of the discharge conveyor within the predetermined steering window;
   (c) a paver-locating sensor that is:
      (i) operatively connected to the controller;
      (ii) located and adapted to execute multiple non-contact sensor scan passes across the front end of the paving machine to determine a distance and orientation of the paving machine with respect to the paver-locating sensor;
      (iii) operable without any modification to the paving machine;
      (iv) adapted to communicate information to the controller about the distance and orientation of the paving machine with respect to the paver-locating sensor, which information is used by the controller to determine elevation control adjustment signals and steering control adjustment signals for the discharge conveyor.

2. The material transfer vehicle of claim 1 wherein the controller is operatively connected to:
   (a) a first feedback mechanism for the elevation control system for the discharge conveyor so that the controller may receive information about the elevation of the discharge conveyor;
   (b) a second feedback mechanism for the steering control system for the discharge conveyor so that the controller may receive information about the angular orientation of the discharge conveyor with respect to the longitudinal axis of the material transfer vehicle.

3. The material transfer vehicle of claim 1 wherein the paver-locating sensor is adapted to execute multiple non-contact sensor scan passes across the front end of the paving machine, with each scan in a pass being directed towards the paving machine at a different angle with respect to the longitudinal axis of the material transfer vehicle from that of the other scans in the pass.

4. The material transfer vehicle of claim 1 wherein the paver-locating sensor is adapted to execute multiple non-contact sensor scan passes across the front end of the paving machine in an adjustable horizontal band of up to about 48°.

5. The material transfer vehicle of claim 1 wherein the paver-locating sensor is adapted to execute multiple non-contact sensor scan passes across the front end of the paving machine within an adjustable vertical band of about 6°.

6. The material transfer vehicle of claim 1 wherein the paver-locating sensor is located below the discharge conveyor.

7. The material transfer vehicle of claim 1 wherein the paver-locating sensor is located on the underside of the paver-loading conveyor.

8. The material transfer vehicle of claim 1 wherein the paver-locating sensor comprises:
  (a) a light-emitting component;
  (b) a light-receiving component comprising a multi-channel photodetector array that collects the backscatter of emitted light from the light-emitting component and measures the time taken for the emitted light to return to the light-receiving component.

9. The material transfer vehicle of claim 8 wherein the controller uses the measurement of time taken for the emitted light to return to the light-receiving component of the paver-locating sensor to determine the distance from the paver-locating sensor to the front end of the paving machine.

10. The material transfer vehicle of claim 1:
  (a) which further includes a propulsion control system that drives the material transfer vehicle along the roadway;
  (b) which further includes a steering control system that steers the material transfer vehicle on the roadway;
  (c) wherein the controller is:
    (i) operatively connected to the propulsion control system and the steering control system for the material transfer vehicle;
    (ii) adapted to determine speed control adjustment signals for communication to the propulsion control system for the material transfer vehicle in order to maintain the location of the material transfer vehicle within a predetermined distance window from the paving machine;
    (iii) adapted to communicate the speed control adjustment signals to the propulsion control system for the material transfer vehicle so that the speed of the material transfer vehicle with respect to the paving machine may be adjusted based upon communication from the controller in order to maintain the material transfer vehicle within the predetermined distance window from the paving machine;
    (iv) adapted to determine steering control adjustment signals for communication to the steering control system for the material transfer vehicle in order to maintain the direction of the material transfer vehicle on the roadway within a predetermined steering window;
    (v) adapted to communicate the steering control adjustment signals to the steering control system for the material transfer vehicle so that the direction of material transfer vehicle on the roadway may be adjusted based upon communication from the controller in order to maintain the direction of the material transfer vehicle within the predetermined steering window.

11. The material transfer vehicle of claim 10:
  (a) which further includes a front wheel set by which the material transfer vehicle may be steered along the roadway;
  (b) wherein the controller is operatively connected to:
    (i) a speed sensor for determining the speed of the material transfer vehicle along the roadway;
    (ii) a steering sensor for determining the steering angle of the front wheel set of the material transfer vehicle.

12. The material transfer vehicle of claim 10:
  (a) wherein the controller is adapted to determine the predetermined distance window and the predetermined steering window of the material transfer vehicle with respect to the paving machine;
  (b) which further includes a status light assembly including a status light on the material transfer vehicle, said status light assembly being operatively connected to the controller;
  (c) wherein the controller is adapted to illuminate the status light if the material transfer vehicle is not within the predetermined distance window or the predetermined steering window with respect to the paving machine.

13. The material transfer vehicle of claim 10:
  (a) wherein the controller is adapted to determine the predetermined distance window and the predetermined steering window of the material transfer vehicle with respect to the paving machine;
  (b) which includes a status light assembly including a plurality of status lights on the material transfer vehicle, said status light assembly being operatively connected to the controller;
  (c) wherein the controller is adapted to illuminate a first status light on the status light assembly when the material transfer vehicle is within the predetermined distance window and the predetermined steering window with respect to the paving machine;
  (d) wherein the controller is adapted to illuminate a second status light on the status light assembly when the material transfer vehicle is within the predetermined distance window and the predetermined steering window with respect to the paving machine, but drifting towards the paving machine;
  (e) wherein the controller is adapted to illuminate a third status light on the status light assembly when the material transfer vehicle is closer than the predetermined distance window and the predetermined steering window with respect to the paving machine;
  (f) wherein the controller is adapted to illuminate a fourth status light on the status light assembly when the material transfer vehicle is within the predetermined distance window and the predetermined steering window with respect to the paving machine, but drifting away from the paving machine;
  (g) wherein the controller is adapted to illuminate a fifth status light on the status light assembly when the material transfer vehicle is farther away from the predetermined distance window and the predetermined steering window with respect to the paving machine.

14. The material transfer vehicle of claim 10 wherein the controller is adapted to bring the material transfer vehicle to a halt if the sensor is unable to locate the front end of the paving machine.

15. A method for operating a material transfer vehicle that is supplying asphalt paving material to a hopper on the front end of a paving machine, said material transfer vehicle having a longitudinal axis and a discharge conveyor with an output end having a discharge chute mounted thereon, which discharge conveyor is mounted for pivotal movement about a substantially horizontal pivot axis at its input end as raised and lowered by an elevation control system, and is also adapted for side-to-side movement with respect to the longitudinal axis of the material transfer vehicle, about a substantially vertical pivot axis by operation of a steering control system, said method comprising:

(a) providing a controller on the material transfer vehicle that is operatively connected to the elevation control system and the steering control system for the discharge conveyor, said controller including a non-transitory memory and being;
  (i) operatively connected to a first feedback mechanism for the elevation control system for the discharge conveyor so that the controller may receive information about the elevation of the discharge conveyor;
  (ii) operatively connected to a second feedback mechanism for the steering control system for the discharge conveyor so that the controller may receive information about the angular orientation of the discharge conveyor with respect to the longitudinal axis of the material transfer vehicle;
  (iii) adapted to determine elevation control adjustment signals for communication to the elevation control system for the discharge conveyor in order to maintain an elevation of the discharge conveyor within a predetermined elevation window;
  (iv) adapted to communicate the elevation control adjustment signals to the elevation control system for the discharge conveyor so that the elevation of the discharge conveyor may be adjusted based upon communication from the controller;
  (v) adapted to determine steering control adjustment signals for communication to the steering control system for the discharge conveyor in order to maintain an angular orientation of the discharge conveyor with respect to the longitudinal axis of the material transfer vehicle within a predetermined steering window;
  (vi) adapted to communicate steering control adjustment signals to the steering control system for the discharge conveyor so that the angular orientation of the discharge conveyor with respect to the longitudinal axis of the material transfer vehicle may be adjusted based upon communication from the controller;
(b) providing a paver-locating sensor on the material transfer vehicle that is:
  (i) operatively connected to the controller;
  (ii) located and adapted to execute multiple non-contact sensor scan passes across the front end of the paving machine to determine a distance and orientation of the paver-locating sensor with respect to the paving machine, without the need for any modification to the paving machine;
  (iii) adapted to communicate information to the controller about the distance and orientation of the paver-locating sensor with respect to the paving machine, which information is used by the controller to determine elevation control adjustment signals and steering control adjustment signals for the discharge conveyor;
(c) positioning the material transfer vehicle in a desired location with respect to the paving machine and with the discharge chute located over the hopper of the paving machine in a desired position;
(d) activating the paver-locating sensor to calibrate the steering control system and the elevation control system by executing a scan pass comprising the emission of light in a plurality of different angular orientations across the front of the paving machine;
(e) storing the distances measured by the plurality of scans in the controller's memory as baseline points;
(f) storing a baseline elevational and steering orientation of the discharge conveyor in the controller's memory;
(g) operating the paving machine to begin paving operations;
(h) activating the paver-locating sensor to execute multiple non-contact sensor scans across the front end of the paving machine during operation of the paving machine to determine the distance from the paver-locating sensor to the front end of the paving machine;
(i) communicating the distance information obtained by the multiple non-contact sensor scans during operation of the paving machine to the controller;
(j) causing the controller to compare the distance information obtained by the multiple non-contact sensor scans during operation of the paving machine with the baseline points stored in the controller's memory;
(k) causing the controller to communicate elevation control adjustment signals to the elevation control system and steering control adjustment signals with the steering control system for the discharge conveyor of the material transfer vehicle to cause these control systems to maintain the discharge conveyor within the predetermined elevation window and the predetermined steering window with respect to the hopper of the paving machine during the paving operation.

16. The method of claim 15 wherein the controller that is provided is adapted to bring the material transfer vehicle to a halt if the sensor is unable to locate the front end of the paving machine.

* * * * *